United States Patent [19]

Nakamura et al.

[11] Patent Number: 5,757,374
[45] Date of Patent: May 26, 1998

[54] METHOD AND APPARATUS FOR PERFORMING TEXTURE MAPPING

[75] Inventors: Fusashi Nakamura, Tokyo-to; Kei Kawase, Sagamihara; Takao Moriyama, Yokohama, all of Japan

[73] Assignee: International Business Machines Corporation, Armonk, N.Y.

[21] Appl. No.: 519,497

[22] Filed: Aug. 25, 1995

[30] Foreign Application Priority Data

Aug. 29, 1994 [JP] Japan ................................. 6-203578

[51] Int. Cl.⁶ ...................................................... G06T 11/00
[52] U.S. Cl. ................................................................ 345/425
[58] Field of Search ............................ 395/119, 120, 395/123, 125, 126, 128, 129, 130, 131, 133; 345/419, 420, 423, 425, 426, 428, 429, 430, 431, 433

[56] References Cited

U.S. PATENT DOCUMENTS 5,548,709  8/1996  Hannah et al. ........................ 395/119

OTHER PUBLICATIONS

Computer Graphics Proceedings, Annual Conference Series, 1993, "Reality Engine Graphics", by Kurt Akeley, pp. 109–116.

*Primary Examiner*—Almis R. Jankus
*Attorney, Agent, or Firm*—Richard A. Henkler

[57] ABSTRACT

A computer graphics apparatus connects a texture coordinate generator with fragment generators via a command bus. The generator is connected to a texture data bus through a texture memory cluster which comprises an address generator connected to a texture coordinate bus, a filter, and eight memories. In addition, the generator is connected to the texture data bus through a plurality of texture memory clusters. The texture data bus is connected to a plurality of drawing processors to which a plurality of frame memories are connected in correspondence. This configuration performs texture mapping through effective utilization of the texture memory clusters.

8 Claims, 7 Drawing Sheets

METHOD AND APPARATUS FOR PERFORMING TEXTURE MAPPING

BACKGROUND

1. Field of the Present Invention

The present invention relates to a computer graphic apparatus, and more particularly, to a computer graphic apparatuses using texture mapping for mapping patterns and the like on a predetermined area of an object.

2. History of Related Art

In computer graphics, an image may be produced by texture mapping wherein various patterns or images (textures) are mapped. The texture mapping means to map a pattern or image (texture) with no thickness such as the grain of wood or the stripe of a watermelon onto a smooth plane or a curved surface. For example, a flight simulator provides a virtual realistic image at high speed by texture mapping a photo image of a previously shot landscape onto the background.

However, because texture mapping requires large amount of data access and calculations, it requires a texture memory with a wide bandwidth and dedicated hardware in order to perform real-time processing. The texture memory is a memory for storing two-dimensional array data (hereinafter called "texture image data") representing images such as patterns or background to be mapped. The texture memory is expensive because it requires high-speed access and large capacity.

As computers have recently gained increased large capacity, smaller size, and higher speed, computer systems utilizing computer graphics must provide, at low cost, hardware enabling texture mapping efficiently and at high speed. Texture mapping will be explained in greater detail below.

Coordinate Systems in Texture Mapping

It is customary in the computer graphics industry to represent an object by using three types of coordinate systems.

The first is a model coordinate system. It is a coordinate system specific to each object, that is, a coordinate system suitably selected for describing an object. FIG. 5A shows a cube OB as an object in an orthogonal coordinate system where the X, Y, and Z axes orthogonally intersect with each other.

The second is an eye coordinate system. It is a coordinate system aligned to the position of an eye substantially viewing an object, that is a coordinate system in which the view line aligns one coordinate axis as shown in FIG. 5C.

The third is a screen coordinate system. It is a coordinate system in a two-dimensional screen SC (see FIG. 5C on which a three-dimensional scene containing an object is projected as shown in FIG. 5D. The screen coordinate system in FIG. 5C is formed by an abscissa X_S and an ordinate Y_S.

In addition to the above-mentioned three types of coordinate systems, texture mapping requires a coordinate system which describes texture image data as shown in FIG. 5B (hereinafter called a "texture coordinate system"). The texture coordinate system in FIG. 5B is formed by an abscissa U and an ordinate V. The substantial operation of texture mapping is to paint colors of texture image data specified by the texture coordinates on points in the screen coordinate system where original colors of an object should be painted.

The model coordinate system is a coordinate system for simply describing each basic object for convenience when handling a complicated object which is a combination of a plurality of basic objects. Therefore, in order to describe a complicated object on the screen coordinate system through texture mapping, the complicated object combining together these plurality of basic objects is first described in the eye coordinate system. Here, description is made of a case where a cube OB is shaded for its top surface and texture mapped for its sides (see the cube $OB_1$ in FIG. 5C. Then, it is defined to project the described plurality of basic objects onto the screen SC. At the moment, the complicated object (the cube $OB_1$) is described on the screen coordinate system. To simplify the description that follows, the object to be handled is assumed to be already converted to the screen coordinate system.

Details of Texture Mapping

As seen from FIG. 6A, texture image data is formed in a square with a predetermined size (in FIG. 6A, a square region formed by 8×8 unit squares) in which unit squares (squares with the length of a side of 1) are vertically and horizontally arranged on a plane. Color information for the image to be mapped is stored at the center of each unit square around a grid point, that is, a grid point (X in the figure) corresponding to the i-th column ($0 \leq i \leq 7$) and the j-th row ($0 \leq j \leq 7$).

In the following, each unit square is referred to a "texel," the center of unit square to a "center of texel," color information stored in the center of texel to a "texel value," and the square region with the predetermined size in which texels are arranged to a "texture." In addition, the number of texels (8×8 in FIG. 6A is referred to the size of texture. For the simplicity of the following description, the texel value for a texel at the j-th row and the i-th column (i, j) is referred to T [i, j].

Next, when the texture is mapped on a curved surface, a typical curved surface is divided into polygons, and therefore the texture mapping in the eye coordinate system is a linear conversion between a polygon and a texture. This causes each point on the polygon to exactly correspond to each point in the texture on a one-to-one basis, and the correspondence can be completely determined in mapping the texture on the polygon. Ultimately, the color of each pixel in the polygon projected on a screen must be determined. Therefore, on the screen coordinate system, each pixel on the eye coordinate system must correspond to each texel in the texture. However, because the screen coordinate system is the eye coordinate system projected on the screen SC, the coordinates for a point P (u, v) corresponding to a pixel (x_s, y_s) have been determined. The color of the pixel (x_s, y_s) is determined by using the correspondence. Algorithms generally used for determining color are roughly divided into a method using original texture image data and data called a mipmap, which will be described later, and which is further processed original data, and a method using original texture image data and the like without using the mipmap.

The method not using the mipmap includes two approaches. One is an approach making a texel value for a texel containing the point P the color of pixel. That is, the texel value T [$i_o$, $j_o$] for a texel ($i_o$, $j_o$) closest to the point P is made the color of pixel. The arguments $i_o$ and $j_o$ may be found as the integer part of u+0.5 and v+0.5, respectively. This is an approach called the texel nearest in OpenGL which is one of application programming interfaces (APIs)

for three-dimensional graphics interface (Mar Segal, Akeley, The OpenGL Graphics System: A Specification Version 1.0).

However, if a polygon to be texture-mapped is significantly reduced on the screen coordinate system because it is a large distance away (a state where points corresponding to pixels adjacent in the texture are significantly separated), an image thus formed is jagged (or a jaggy is formed).

Another approach is a second texel linear interpolation (also called "texel linear" for short, which is used in the following) which is an improvement on the above approach. In this case, as shown in FIG. 6A, the values of four texels surrounding the point P are linearly interpolated. That is, assuming that the texel centers around the point P (u, v) are $(i_o, j_o)$, $(i_o+1, j_o)$, $(i_o, j_o+1)$, and $(i_o+1, j_o+1)$ (bold X in the figure), and that a=fraction of u and b=fraction of v, the value obtained from the following equation is made the color of pixel:

$(1-a) \times (1-b) \times T[i_o, j_o] + (1-a) \times b \times T[i_o, j_o+1] + a \times (1-b) \times T[i_o+1, j_o] + a \times b \times T[i_o+1, j_o+1]$ The arguments $i_o$ and $j_o$ may be found as the integer part of u and v. Because, as understood from the equation, this approach is equivalent to a case where the linear interpolation is conducted twice, it is also called bi-linear.

The method using the mipmap will be described in detail below:

In the method described earlier, there arises a disadvantage when a polygon with a large angle to the screen is projected because the ratio of expansion and reduction of the texel at each point on the projected polygon is significantly varied depending on the position of the pixel. That is, the weighted average of four texels as described above is not sufficient for a texel which is extremely reduced on the screen, but many texels are required. The required texels can be found from the level of detail (which can be calculated from the correspondence between a pixel and a texel, and hereinafter called the "LOD") between a pixel and a texel. Since such method changing the manner to determine an average (a method called convolution) for each pixel is effective but not efficient, and difficult to be implemented, it is a usual approach to use, as an alternative, the mipmap.

In the mipmap, each two texels in the vertical and horizontal directions in an original texture surrounded by thick lines in FIG. 6A are first put together in a block. Then, the texel value for the block is found by averaging the texel values for four texels contained in the block. Then, as shown in FIG. 6B, a new texel is generated for corresponding to the found texel value, and arranged at the position of the block in the original texture. This operation is repeatedly performed for all blocks to generate a new texture. The original texture (FIG. 6A is called the mipmap at level 0, and the new texture with a size of one half (FIG. 6B is called the mipmap at level 1 to distinguish the new texture generated by putting the texels together in blocks from the original texture before generation. Then, the mipmap at level 1 is similarly processed to generate a mipmap at level 2. Processing similar to the above is repeated until a texture to be generated becomes a texture with a size of 1 to generate mipmaps at higher levels. In this case, it is a matter of course that the texel value depends on the level of the mipmap. To represent this, the above symbols are extended to represent the texel value for a texel (i, j) in a mipmap at level k as T [i, j:k].

Before performing texture mapping by using the mipmap, the level of the mipmap to be used must be determined from the LOD. Although OpenGL defines this in detail, here description is made by simplifying the specifications to necessary areas only. There is a concept of mipmap nearest and mipmap linear similar to the above-mentioned texel nearest and texel linear, and there are four texel mipmap methods in total. It should be noted here that the coordinates P (u, v) for a point corresponding to a pixel in the mipmap at each level becomes $P_k (u_k, v_k)$ depending on the level k. Each of the four texel mipmap methods will be described in the following:

(1) Nearest-Mipmap-Nearest

It finds a point $P_k (U_k, V_k)$ corresponding to a pixel in the mipmap at level k where k=integer part of LOD +0.5, and makes the texel value T $[i_o, j_o:k]$ the color of the pixel.

(2) Linear-Mipmap-Nearest

It finds a point $P_k (U_k, V_k)$ corresponding to a pixel in the mipmap at level k where k=integer part of LOD +0.5, and linearly interpolates the texel values of four texels surrounding the point $P_k$. This is the same as the texel linear described earlier except for the "level k."

(3) Nearest-Mipmap-Linear

It linearly interpolates with d=(fraction part of LOD) as the interdivision ratio the texel values of texels containing points $P_k$ and $P_{k+1}$, respectively, which correspond to pixels in each of the mipmaps at level k and k+1 where k=integer part of LOD.

(4) Linear-Mipmap-Linear

It linearly interpolates (mipmap linear) with d=(fraction part of LOD) as the interdivision ratio the result of linear interpolation of the texel values of four texels containing the point $P_k$ corresponding to a pixel in a mipmap at level k where k=integer part of LOD, and the result of linear interpolation (texel linear) of the texel values of four texels containing the point $P_{k+1}$ corresponding to a pixel in a mipmap at level k+1.

A computer graphics apparatus for performing texture mapping at a high speed by using the mipmap method described above requires the following:

A large capacity of texture memory;

A high access speed for memory used as texture memory; and

Efficient utilization of texture memory.

That is, the texture memory requires a capacity of several megabytes in storing the texture image data for texture. Thus, DRAMs of low cost are usually used for the texture memory. Because the DRAMs have a cycle time of about 80 ns, if, for example, an access speed of 100M texels/s is required, it is possible to attain the intended speed performance by duplicating the same texture image data eight times, and interleaving them for use.

In addition, as described above, the linear-mipmap-linear approach requires the simultaneously referencing of eight texel values. It is sufficient for the simultaneous referencing of eight texel values to provide an arrangement which enables simultaneous reference to the texel values necessary for linear-mipmap-linear by interleaving each level of the mipmap, interleaving each level for i and j, and storing them in eight memories.

In addition, it is necessary that a circuit-calculation linear interpolator (interpolator) be directly connected to eight memories. The bit width for the address bus for each memory chip and the data bus from each memory chip to the interpolator becomes (20+16)×8=288 bits even if an address is of 20 bits and the texture image data is of 16 bits, which leads to problems making the wiring complicated and causing a pin bottleneck for the chip (a limitation on the number of signals which can be sent from one chip).

Examples of Related Art

As an example satisfying the above requirements, there is a texture mapping processing method accommodating a computer graphics apparatus (see PUPA 62-140181 specification). In this texture mapping processing method, texture image data is provided in a processor element without overlapping, and texture image data within another processor element is received through a interprocessor communication path.

However, the computer graphics apparatus has the following problems:

It is basically a mechanism performing processing with software. Its operation is complicated and difficult to be implemented with hardware. High-speed operation cannot be expected;

Because the section processing drawing corresponds to the section processing texture on a one-to-one basis, the ratio of each processing cannot be varied. Thus, the volume of section processing texture cannot be varied for performance requirements for the type and size of drawing primitives and the size of texture image mapped to them;

Because it is a protocol sending information on pixels to be displayed to another processor element through an interprocessor communication path, and receiving the result of operation based on the information being sent, the protocol has a large overhead; and Because it cannot be ensured that the texture image data exists in one processor element, it is necessary to supply the texture image data before the filtering operation to the interprocessor communication path, and the capacity required for communication becomes enormous, which is inefficient.

As a computer graphics apparatus of another example, there is reality engine graphics (see "Computer Graphics Proceedings," Annual Conference Series, 1993, pp. 116).

As shown in FIG. 7, the computer graphics apparatus 90 comprises a command processor 12. The command processor 12 is connected to fragment generators 72, 74, 76, and 78 through a command bus 16.

One of the outputs of the fragment generator 72 is connected to a drawing processor 42 through a texture memory cluster 22 as a texture memory, and the other output is directly connected to the drawing processor 42. The drawing processor 42 is connected to a frame buffer 52 the output of which is connected to a display 60. The texture memory cluster 22 comprises an address generator 62, memories 64A, 64B, 64C, 64D, 64E, 64F, 64G and 64H, and a filter 66. The address generator 62 is connected to the memories 64A–64H which are in turn connected to the filter 66.

Furthermore, one of the outputs of the fragment generator 74 is connected through a texture memory cluster 24 to a drawing processor 44 connected to the frame buffer 54, while the other is directly connected to the drawing processor 44. Similarly, one of the outputs of the fragment generator 76 is connected through a texture memory cluster 26 to a drawing processor 46 connected to a frame buffer 56, while the other is directly connected to the drawing processor 46. One of the outputs of the fragment generator 78 is connected through a texture memory cluster 28 to a drawing processor 48 connected to a frame buffer 58, while the other is directly connected to the drawing processor 48. In addition, outputs of the frame buffers 54, 56, and 58 are connected to the display 60.

The texture memory clusters 24, 26, and 28 have the same arrangement as that of the texture memory cluster 22 so a detailed description of them will be omitted here.

In addition, in the computer graphics apparatus 90, the screen is divided into four rows in the vertical direction. Pixels belonging to each of divided sections are handled and processed by the texture memory clusters 22, 24, 26, and 28.

The operation of the computer graphics apparatus 90 is now described by the following:

First, the command processor 12 interprets instructions for the fragment generators 72–78, the texture memory clusters 22–28, and each processor of the drawing processors 42–48 downstream from it, and outputs instructions on the command bus 16. Such instructions include a control command for storing data in a register (not shown) in respective processors and a draw command. Drawing on the screen is performed in the unit of a triangle (a unit of a polygon). When the command processor 12 receives the draw command, it also receives following data in a unit of vertex of triangle such as the coordinates of the vertex of triangle. The format of the data is shown in Table 1.

TABLE 1

Data format

| x_s, y_s | R, G, B, A | u, v | where x_s, y_s:   Coordinates of vertex of triangle in the screen coordinate system
R, G, B, A: Color information at coordinates on the screen SC (x_s, y_s)
u, v:       Coordinates of texture image data to be texture-mapped to the coordinates (x_s, y_s) in the texture coordinate system This data is simultaneously broadcast to each of the fragment generators 72, 74, 76, and 78 through the command bus 16. Each fragment generator interpolates the obtained data to generate data in the unit of a pixel within a triangle. If the pixel data thus generated is that for a pixel handled by that fragment generator, the fragment generator outputs data interpolated in the unit of a pixel shown in Table 2 to the corresponding one of the drawing processor 42–48.

TABLE 2

| x_s, y_s | R, G, B, A |

At the same time, the fragment generator outputs the data shown in Table 3, that is, the coordinates of vertex of triangle in the screen coordinate system, and the coordinates (u, v) of texture image data to be texture-mapped to the coordinates (x_s, y_s) in the texture coordinate system, to a corresponding texture memory cluster.

TABLE 3

| x_s, y_s | u, v |

If the generated pixel data is not that for a pixel handled by that fragment generator, the data is disposed of in the drawing processor. However, because a pixel is surely handled by some fragment generator, there arises no pixel which is not processed at all. The address generator in the texture memory cluster finds texels necessary for the calculation by the above-mentioned method, for example, linear-mipmap-linear, and calculates and outputs the physical addresses of those texels to the memory based on the coordinates (u, v). The memory outputs texel values based on the physical addresses to the filter. Then, the filter performs calculation necessary for, for example, linearmipmap-linear based on the output texel values, and outputs color information to be mapped to the pixel and from the texture memory cluster to the corresponding drawing processor. The drawing processor reflects the color information to the value of an appropriate pixel stored in the corresponding frame buffer by taking previously input color information and that from the texture memory cluster into account.

Each of the texture memory clusters 22–28 is previously stored with texture image data all of which has the same content. Therefore, it is possible to improve the performance, and, more particularly, to increase the processing speed by a parallel processing effect caused from four texture memory clusters 22–28.

Here, the first computer graphics apparatus described earlier (see PUPA 62-140181 specification) corresponds to a package containing the fragment generator, the texture memory cluster, and the drawing processor in FIG. 7. The difference lies in how the texture image data is stored. That is, in the computer graphics apparatus 90 of FIG. 7, since each texture memory cluster stores the same texture image data, even if any coordinates (u, v) are input, a texel value can be independently searched for, for each of the texture memory clusters. On the contrary, in the first computer graphics apparatus described earlier, the texture image data is divided, and each section is distributed and stored in each texture memory cluster. Therefore, depending on the coordinates (u, v), the computer graphics apparatus may need a texel value not stored in its texture memory cluster. Thus, the first computer graphics apparatus may contribute to the effective utilization of memory but causes large overhead for communication and is difficult to be implemented in hardware.

Furthermore, in the second computer graphics apparatus 90, because the texture memory cluster corresponds to each fragment generator, the cluster is uniquely used. Therefore, the apparatus cannot process the texture image data in division, and cannot handle texture image data larger than the memory in the texture memory cluster 1.

In view of the above-mentioned facts, the present invention is intended to provide a computer graphics apparatus which can efficiently operate the texture mapping function in a computer graphics interface.

SUMMARY OF THE PRESENT INVENTION

In one aspect, the present invention is a computer graphics apparatus for mapping an image onto at least a plane or a curved surface of an object, and displaying the object on a screen. The computer graphics apparatus comprises a plurality of memory clusters. Each one of the plurality of memory clusters comprising a plurality of memory blocks for storing texture image data corresponding to mapping the image, and an interpolator for generating first color information for each of the pixels on the screen by using the texture image data. The computer graphics apparatus further comprising a fragment generator for generating second color information for each of the pixels on the screen. The computer graphics apparatus also comprising a plurality of drawing processors for generating drawing data to be displayed on the screen by using the first and second color information. The computer graphics apparatus further comprising a bus for connecting the plurality of memory clusters with the plurality of drawing processors.

BRIEF DESCRIPTION OF THE DRAWINGS

The present invention will be better understood and its numerous objects and advantages will become more apparent to those skilled in the art by reference to the following drawings, in conjunction with the accompanying specification, in which:

Figures 6A, 6B:
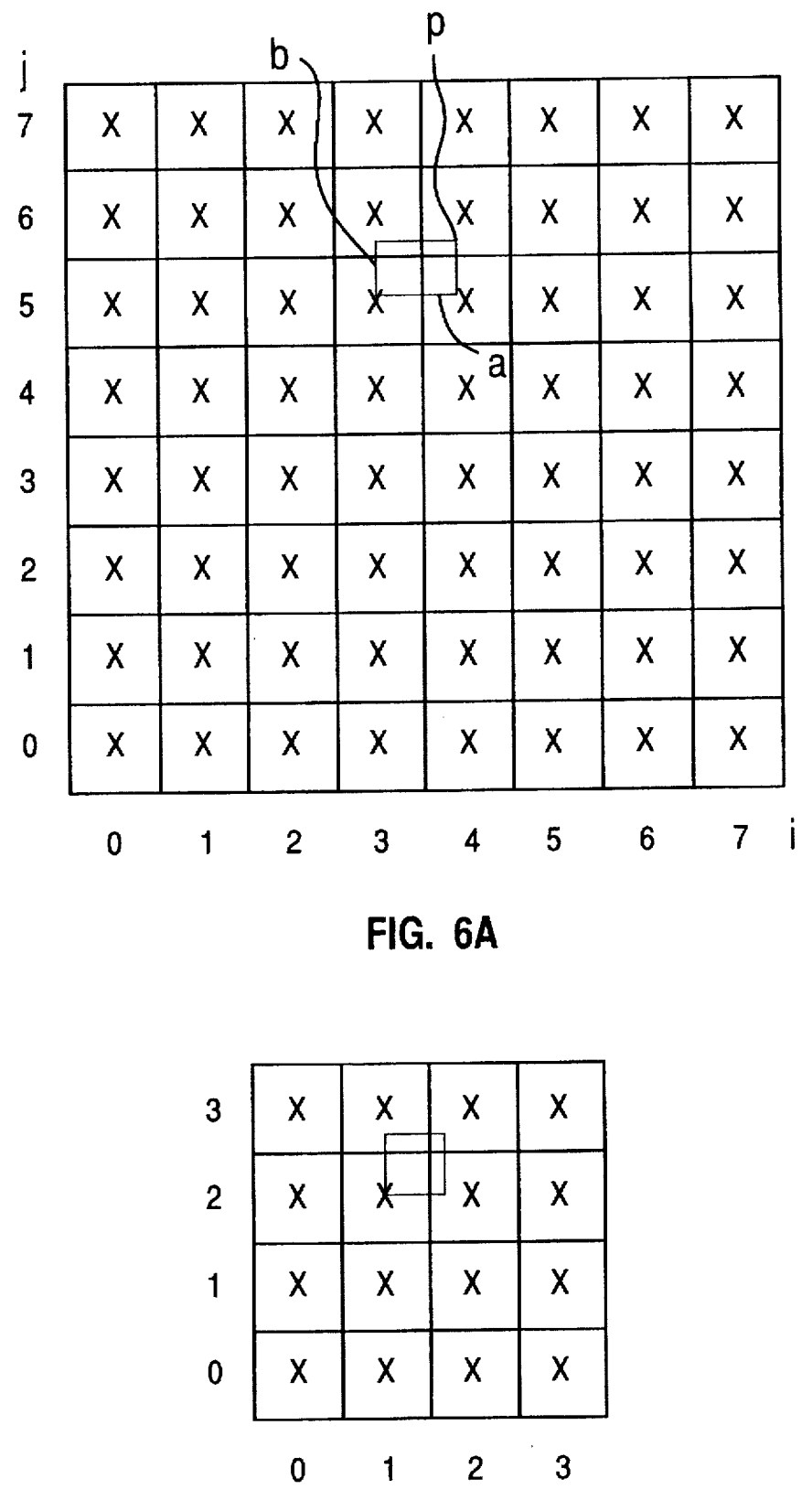

FIGS. 6A–6B are diagrams illustrating a texture image in a mipmap at level 0, and a texture which is a mipmap at level 1 with a half size, respectively.

DETAILED DESCRIPTION OF THE PREFERRED EMBODIMENT OF THE PRESENT INVENTION

Figure 1:
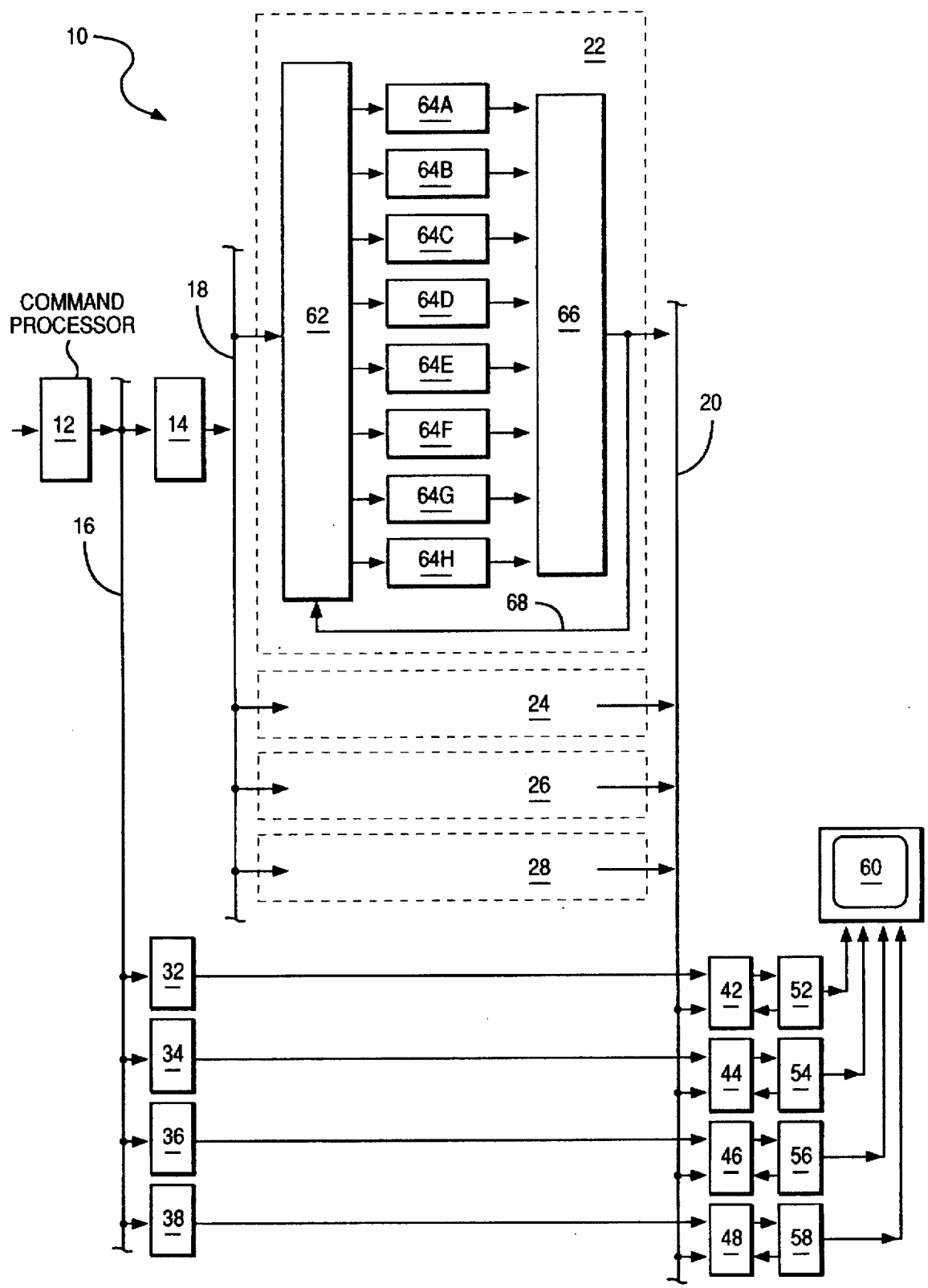
FIG. 1 is a block diagram of a preferred embodiment for a computer graphics apparatus in which the present invention is practiced.
Figure 7:
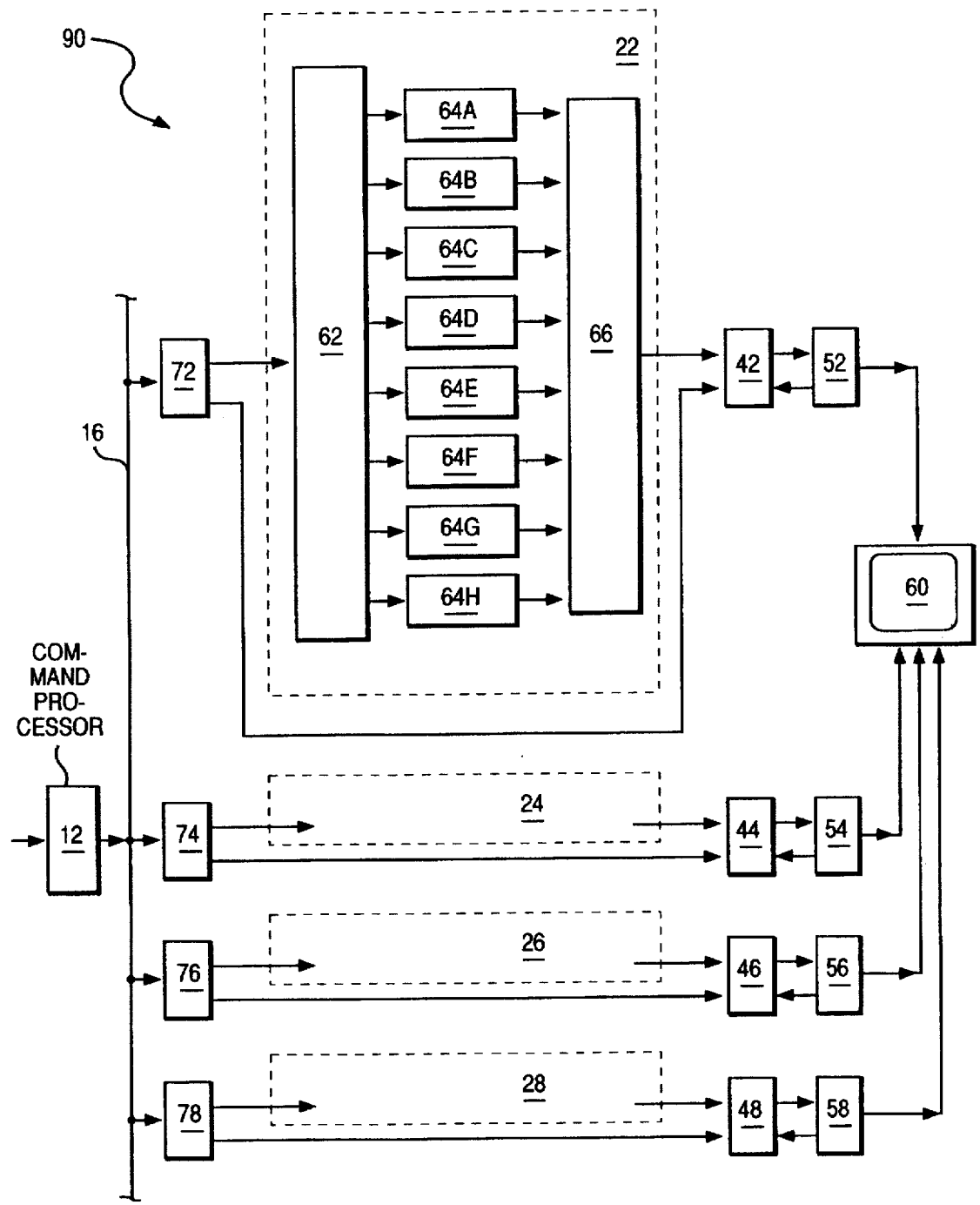
FIG. 7 is a block diagram of a conventional computer graphics apparatus.

As shown in FIG. 1, the computer graphics apparatus 10 of this embodiment comprises, similar to the computer graphics apparatus 90 (see FIG. 7), an address generator 62, a filter 66, and four texture memory clusters 22, 24, 26, and 28. Each of these texture memory clusters 22, 24, 26, and 28 consists of eight memories 64A–64H which serve as texture memories. Although this embodiment is described for a case where there are four texture memory clusters, they are not limited to four, but may be three or less or five or more. Preferably, they are four, eight, or sixteen in number.

In the computer graphics apparatus 10, a texture coordinate generator 14 and each of the fragment generators 32, 34, 36, and 38 are connected to a command processor 12 through a command bus 16. The command processor 12 executably stores processing routines described later. The texture coordinate generator 14 is connected to a texture coordinate bus 18 to which each of texture memory clusters 22, 24, 26, and 28 is connected. In addition, each of the texture memory clusters 22, 24, 26, and 28 is connected to a texture data bus 20 to which each of the drawing processors 42, 44, 46, and 48 is connected. Each of the drawing processors 42, 44, 46, and 48 is then correspondingly connected to frame buffers 52–58.

In the texture memory cluster 22 of the embodiment, the address generator 62 is connected to the output of the filter 62 through a feedback path 68 so that a signal output from the filter 66 is input to the address generator 62 for enabling the feedback described later. Because the texture memory clusters 24, 26, and 28 have the same arrangement as the texture memory cluster 22, a detailed description of them will be omitted here.

Data and the flow of data used for the computer graphics apparatus 10 of the preferred embodiment are now described:

First, the command processor 12 interprets instructions for the texture coordinate generator 14, the fragment generators 32–38, the texture memory clusters 22–28, and each processor of the drawing processors 42–48 downstream, and outputs instructions on the command bus 16. Such instructions include a control command for storing data in a register (not shown) in respective processors and a draw command. Drawing on the screen is performed in the unit of a triangle (the unit of a polygon). When the command processor 12 receives the draw command, it also receives following data in a unit of an vertex of a triangle such as the coordinates of the vertex of the triangle in the format shown in Table 1 above.

The command processor 12 then generates data to a fragment generator in the format shown in Table 4 below ("To FG" means that it is for the fragment generator), and generates data to the texture coordinate generator 14 in the format shown in Table 5 below ("To TG" means that it is for the texture coordinate generator). The command processor 12 provides this data for the command bus 16 independently.

TABLE 4

| To FG | x_s, y_s | R, G, B, A |

TABLE 5

| To TG | x_s, y_s | u, v |

Each of the fragment generators 32–38 generates data in the unit of a pixel within a triangle by interpolating the data obtained through the command bus 16 (Table 4). If the generated pixel data is for a pixel handled by the fragment generator itself, the fragment generator outputs data interpolated for the unit of a pixel (Table 2) to a corresponding one of the drawing processors 42–48.

The texture coordinate generator 14 generates coordinate values in the texture coordinate system of the texture image data for each pixel as the unit by interpolating the data u and v obtained through the command bus 16 (Table 5). At the moment, to specify for which pixel the coordinate values of the texture image data are to be used, the texture coordinate generator 14 also finds the coordinates of the pixel itself by simultaneously interpolating the coordinate values (x_s, y_s) in the screen coordinate system, and broadcasts them to the texture coordinate bus 18 in the format shown in Table 6 below.

TABLE 6

| x_s, y_s | u, v |

The data generated by the texture coordinate generator 14 is broadcast and sent to each one of the texture memory cluster 22–28. If the receiving texture memory cluster has the specified texture image data, and is in a state where it can process it, it processes the received data. If such a requirement is satisfied, the address generator 62 in the texture memory cluster calculates the texel necessary for performing, for example, linear-mipmap-linear from the coordinate values u and v in the texture coordinate system, and finds and outputs a physical addresses of the texels to the memory. The memory outputs texel values corresponding to the physical addresses output from the address generator to the filter 66.

Specifically, each of the texture memory clusters 22–28 is appropriately used in temporal division or spatial division depending on the specification by the user. In temporal division, the same texture image data is stored in each of the texture memory clusters 22–28. The texture memory cluster receives and processes the data if it can process the data. In spatial division, the texture image data is divided and each of the divided sections is distributed to and stored in each of the texture memory clusters 22–28. Each of the texture memory clusters 22–28 references the coordinates (u, v) in the texture coordinate system, and processes the stored section if it is handled by that texture memory cluster.

The filter 66 in each texture memory cluster receives the texel value from the memory, performs calculation necessary for, for example, linear-mipmap-linear, and outputs (broadcasts) to the texture data bus 20 the result (R_t, G_t, B_t, A_t) and the pixel coordinates (x_, y_s) in the format shown in Table 7.

TABLE 7

| x_s, y_s | R_t, G_t, B_t, A_t |

Each of the drawing processors 42–48 receives data supplied from the texture data bus 20, examines the pixel coordinates (x_s, y_s), and, if they are for a pixel handled by that drawing processor, reflects them to the value of the applicable pixel in a corresponding one of the frame buffers 52–58 by taking into account the color information (R, G, B, A) previously received from the fragment generator and the color information from the texture memory cluster (R_t, G_t, B_t, A_t) which are shown in Tables 8 and 9 below.

TABLE 8

| R, G, B, A |

TABLE 9

| R_t, G_t, B_t, A_t |

As described, the computer graphics apparatus 10 of the preferred embodiment is separately provided with a texture coordinate generator 14 for generating the texture coordinates and the like and a fragment generator for generating color and the like. Therefore, a position for mapping can be set independently from and parallel to the generation of attributes such as color.

In this embodiment, data from each of the texture memory clusters 22–28 is output in temporal division mode or spatial division mode. Processing differs in temporal division mode and spatial division mode. The processing in each mode is described in detail below:

Temporal Division

Processing in temporal division mode is first described. Since the above-mentioned texture coordinate generator 14 can be formed using a logic circuit and the like, data can be output in a cycle time of about 20 ns. This causes it to waste differences in time to the processing time of about 80 ns in the texture memory cluster which consists of DRAMs. This embodiment effectively utilizes such time differences.

When the user has specified to place priority on processing speed in texture mapping, the command processor 12 executes a time-sharing processing routine. Such user specification may be performed by the user through operation of an input device such as a keyboard (not shown), or may be predefined by software and the like. First, the same texture image data read from a storage (not shown) is stored in each of the texture memory clusters 22–28. Then, a command is issued to the texture coordinate generator 14 through the command bus 16 for texture mapping. This causes the texture coordinate generator 14 to output data to a corresponding one of the texture memory clusters 22–28.

Therefore, the texture coordinate generator 14 sequentially outputs data to four texture memory clusters through the texture coordinate bus 18 at a speed four times faster than the case where there is only one texture memory cluster (20 ns). When the data is input, each texture memory cluster processes the corresponding texture image data, and then outputs the result to the texture data bus 20. Therefore, even if each of the texture memory clusters 22–28 operates at 80 ns, it is possible to obtain texture image data every 20 ns or so.

As described, since the texture image data with the same content is stored in each of four texture memory clusters 22–28, and each of the texture memory clusters 22–28 is time-divisionally accessed, it is possible to attain an effective speed at four times for the processing of the texture mapping. Therefore, it is possible to improve the processing speed by four times while keeping the size of texture at the current level.

Spatial Division

Processing in spatial division mode will be described next, together with the spatial division means to divide one texture image into a plurality of parts and to assign them to a plurality of different texture memory clusters.

When the user specifies spatial division placing priority on size, the command processor 12 executes a spatial division processing routine to divide the texture image data read from a storage device (not shown) into the predetermined number of regions (four regions in this embodiment). The divided texture image data in each region is stored in correspondence to each of the texture memory clusters 22–28. Then, the command processor 12 issues a command to the texture coordinate generator 14 through the command bus 16 for texture mapping. This causes the texture coordinate generator 14 to simultaneously output data to all of the texture memory clusters 22–28 in every time interval corresponding to the cycle time of the texture memory cluster. Therefore, the texture coordinate generator 14 simultaneously outputs new data to four texture memory clusters through the texture coordinate bus 18 at a rate equivalent to the cycle time of the texture memory cluster (80 ns). When the data is input, each texture memory cluster determines whether or not the input data should be handled by itself (called the "ownership test"), and outputs color information in the texture memory cluster on the texture data bus 20 only when the data should be handled by itself. Therefore, it is possible to obtain data of a size about four times larger every 80 ns when each of the texture memory clusters 22–28 operates.

Therefore, while the processing speed is kept at the current level, the size of texture which can be handled becomes fourfold.

Here, spatial division requires some technique for processing compared to temporal division. That is, when interpolation is performed by referencing neighboring texel values to prevent jaggies, if the texture image data is simply divided, neighboring texel values may not be referenced simultaneously. That is, neighbors cannot be simultaneously referenced at the boundary when the texture image data is divided.

Figure 2:
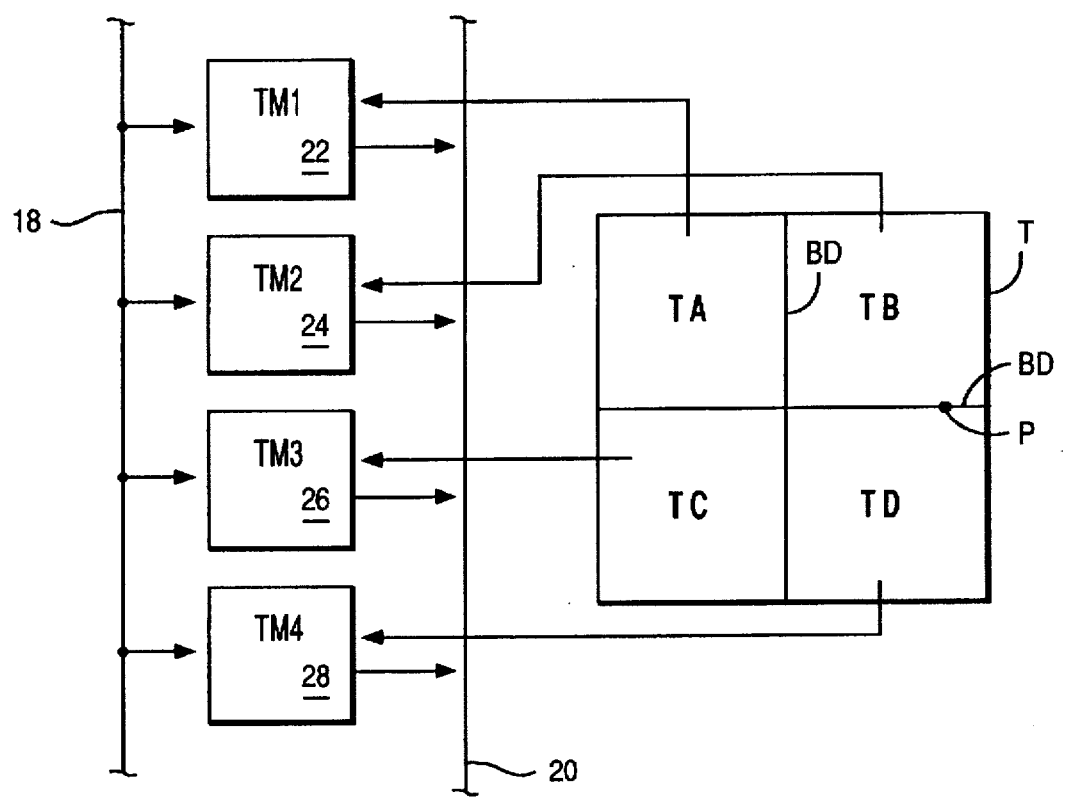
FIG. 2 is a schematic diagram showing the correspondence between divided texture images and texture memory clusters for the computer graphics apparatus of FIG. 1 according to the teachings of the present invention.

As shown in FIG. 2, it is assumed that texture image data T is divided into four regions, TA, TB, TC, and TD, which are stored in four texture memory clusters 22–28 (designated by TM1, TM2, TM3, and TM4 in FIG. 2), respectively. Because a sample point may belong to any of the texture memory clusters 22–28, the texture memory cluster to which the sample point belongs has the texture image data whereby the color information can be output from the texture memory cluster by using the data.

However, when the sample point P is on the boundary BD of the region, the neighboring points are not contained in one texture memory cluster. There are the following two approaches to solve this problem:

Approach 1: It is designed to provide a plurality of texture data buses corresponding to each of the texture memory clusters between the texture memory clusters and the texture data bus 20, and to connect the plurality of texture data buses to the texture data bus 20 through a filter circuit. This enables the filter circuit to filter the output (texture image data) from each of the plurality of texture memory clusters so that filtering can be performed by obtaining the texture image data of neighboring points.

Approach 2: It is designed to store the texture image data on the boundary BD of the regions TA, TB, TC, and TD in each of the texture memory clusters 22–28 overlapping one texel so that the neighboring points on the boundary BD are contained with certainty in one of the texture memory clusters.

Figure 3:
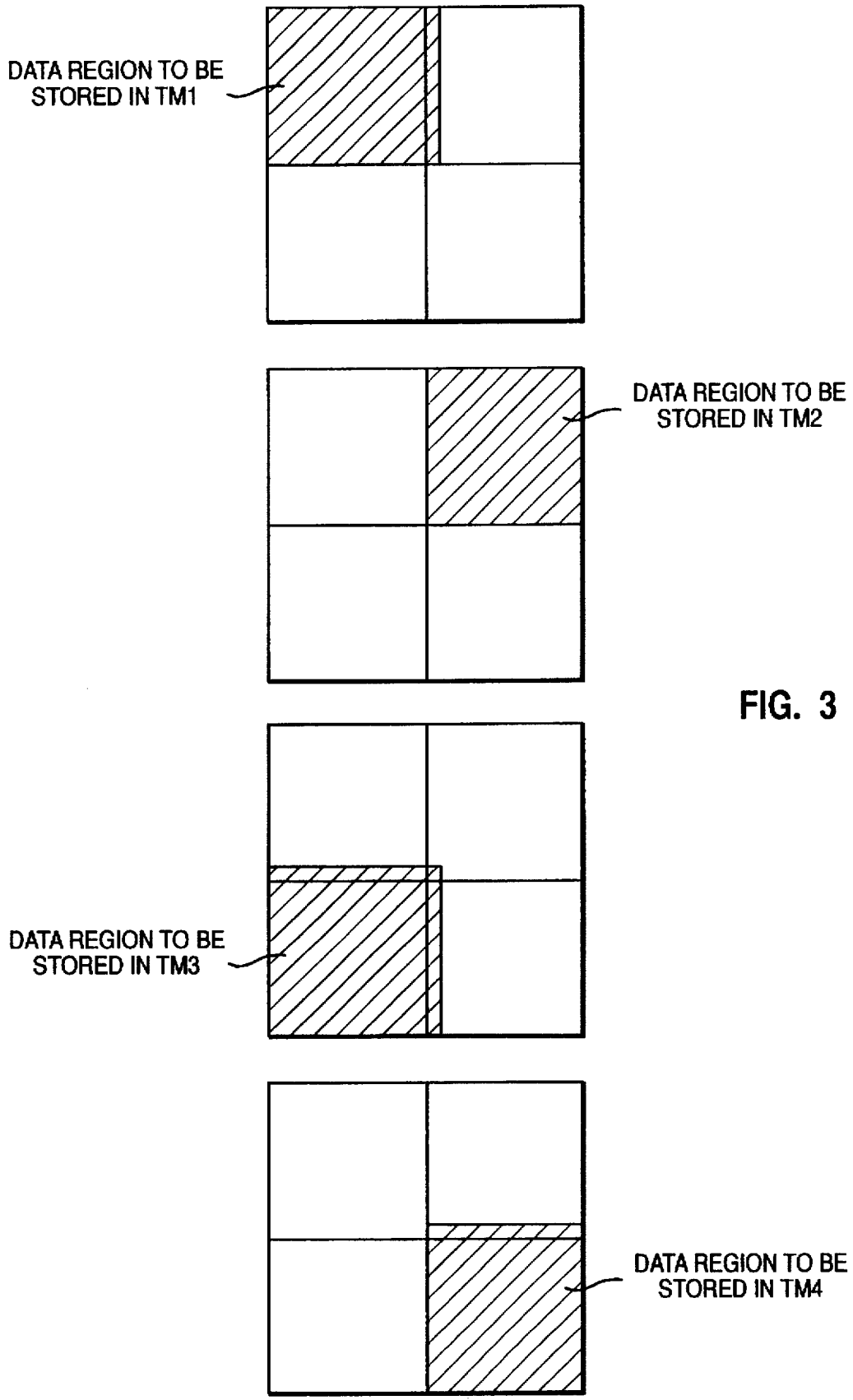
FIG. 3 is a conceptional diagram showing ranges of texture image data to be stored in the texture memory clusters for the computer graphics apparatus of FIG. 1 according to the teachings of the present invention.

The arrangement according to approach 1 does not waste texture memory, but requires an additional external filter circuit because the number of texture data buses increases. The arrangement according to approach 2 is easily implemented because it is simple as a whole, although it wastes some texture memory. An implementation according to approach 2 is now described:

As shown by the shading in FIG. 3, the texture memory cluster 22 (TM1) stores the corresponding texture image data in the region TA together with those for the region TB overlapped by one texel. The texture memory cluster 24 (TM2) stores the corresponding texture image data in the region TB, and the texture memory cluster 26 (TM3) stores the corresponding texture image data in the region TC, together with those for the regions TA and TD overlapped by one texel, respectively. The texture memory cluster 28 (TM4) stores the corresponding texture image data in the region TD together with those for the region TB overlapped by one texel. Thus, it is sufficient to assign the divided regions to each of the texture memory clusters, and to store additional texture image data for one texel above and to the right of each region in each texture memory cluster.

The region for the additional one texel to be stored may be determined in such a manner that one texel overlapped for each region in a predetermined rotational direction (for example, in clockwise) is stored. This makes uniform the capacity in each texture memory cluster for additional storage.

As for waste in the texture memory cluster due to overlapped storage, a case is assumed where texels of 1,000×1,000 are divided into four. The waste due to overlapped storage is 2,000 texels. Therefore, the ratio of all overlapping becomes 2,000/(1,000·1,000)=0.2%, which is understood to be minimum.

As described, the arrangement of the above-mentioned computer graphics apparatus 10 enables it to attain two types of enhancement to expand the size of texture which can be handled (per unit time), and to increase the amount of color information from the generating texture memory cluster. That is, as described above, it is possible to increase the processing speed four times (compared to a case where there is one texture memory cluster) while keeping the size of texture which can be handled in the temporal division at the current level, or to increase the size of texture which can be handled in the spatial division four times while keeping the speed at the current level. In addition, the arrangement of the above-mentioned embodiment can increase the size of texture which can be handled by two times and to increase the processing speed two times by combining temporal division and spatial division. Temporal division and spatial division can be dynamically selected when performing texture mapping.

Therefore, it is possible to obtain any desired size and processing speed by increasing or decreasing the number of texture memory clusters of the computer graphics apparatus 10.

As described, this embodiment can dynamically switch the temporal and spatial divisions of memories (texture memories) depending on the instruction by the user or predetermined setting. That is, since the texture memory cluster usually stores texture image data corresponding to a plurality of texture images, it is possible to use suitable texture image data by changing the division mode for each texture image.

Thus, the capacity of the texture memory clusters can be saved by spatially dividing texture image data which appears in one scene less frequently, and storing them in the texture memory clusters. The drawing speed can be improved by temporally dividing texture image data which appears frequently in one scene, and storing it in the texture memory clusters. Therefore, the capacity of texture memory clusters being used can be suppressed by changing the division mode depending on the frequency of the appearance and the size of texture image data while preventing any deterioration in drawing speed for the entire scene.

In a conventional computer graphics apparatus, in a case where the texture image data overflows the texture memory clusters, the drawing speed is lowered because the texture image data should be replaced during drawing. On the contrary, in the computer graphics apparatus of the preferred embodiment, because the texture memory clusters can be properly controlled, the drawing speed can be made maximum with the same amount of texture memory clusters by temporally dividing the texture image data in the sequence of usage within a range not causing overflow.

Here, the texture memory cluster of the computer graphics apparatus according to the embodiment is arranged to input signals output from the filter 66 to the address generator 62 thorough the feedback path 68.

Therefore, multiple references can be performed in which the memory is referenced again by using the texture image data obtained by referencing the memories 64A–64H consisting of DRAMs once. An example of such multiple references to memory is to store the texture image data to be stored in the memories 64A–64H as index values which represent the positions of RGB values in an array of previously stored RGB values. This enables it to reference and output the RGB values corresponding to the index values by referencing the index values from the coordinates of texture image data corresponding to the original image which is input by the first access, and inputting the referenced index values to the address generator 62 through the feedback path 68. Because, in OpenGL, the texel value of texture can be specified by an index, the multiple references to the memory is effective for implementation for OpenGL.

So-called dual reference in which multiple texture mapping is performed by utilizing the feedback path 68 is now described in detail. In the following, the description is made of a case where it is intended to change only the color of texture which is already texture-mapped, for which so-called dual reference is an effective means.

It is assumed to change a black-and-white checkered pattern to a red-and-green checkered pattern. If this change is performed by using conventional texture mapping, it is required to first map the black-and-white checkered pattern with the texture coordinates (see FIG. 4 (A)), and then to again map the red-and-green checkered pattern with the same texture coordinates (see FIG. 4 (B)).

Figure 4:
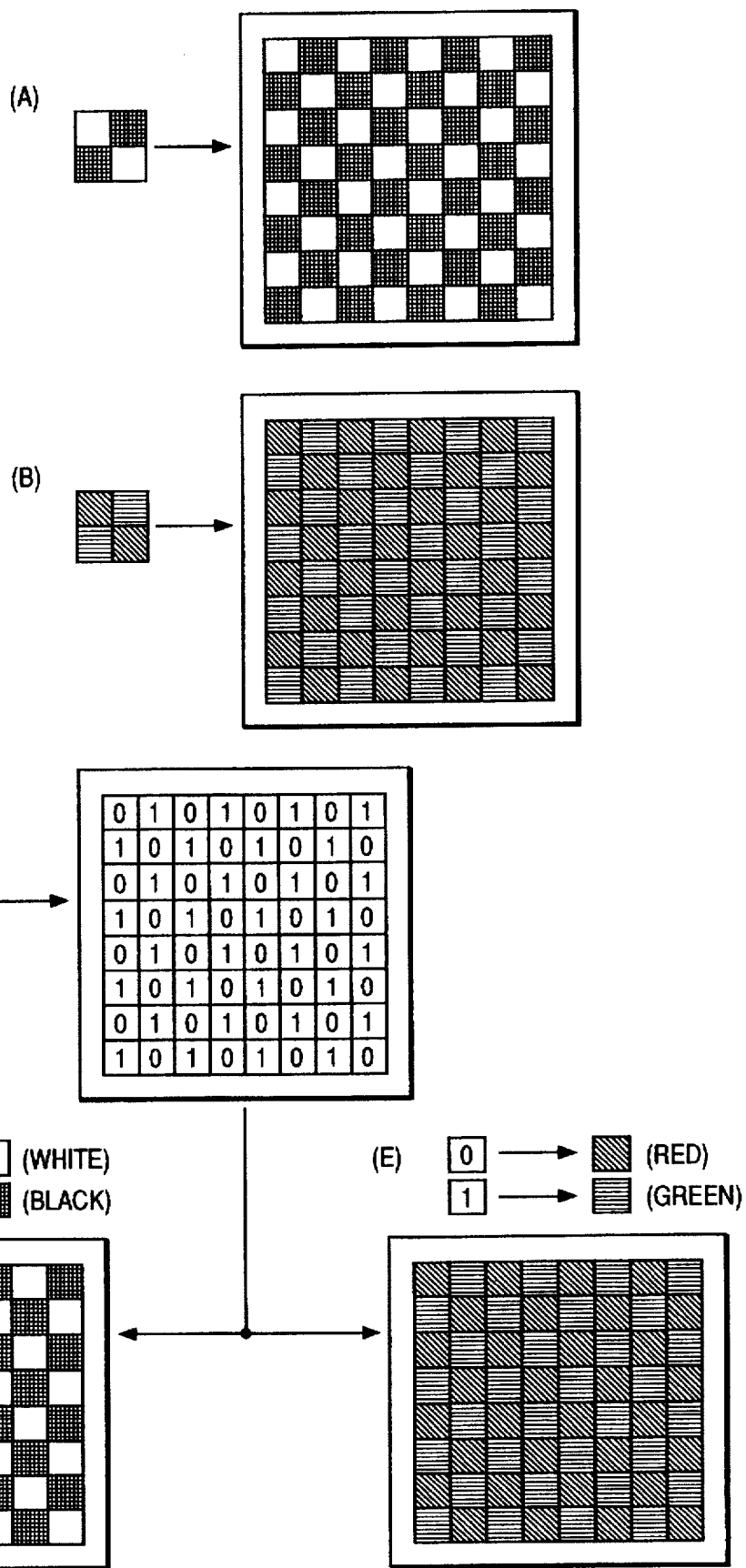
FIG. 4 is a diagram illustrating multiple texture mapping by using the feedback path of the computer graphics apparatus of FIG. 1 according to the teachings of the present invention.
Figure 5A:
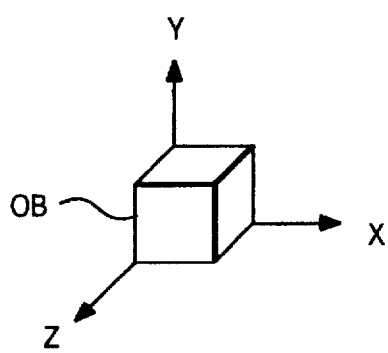
FIGS. 5A–5D are diagrams showing coordinate systems used for computer graphics.
Figure 5B:
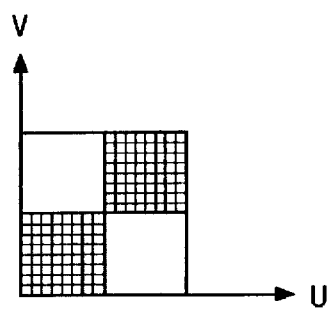
Figure 5C:
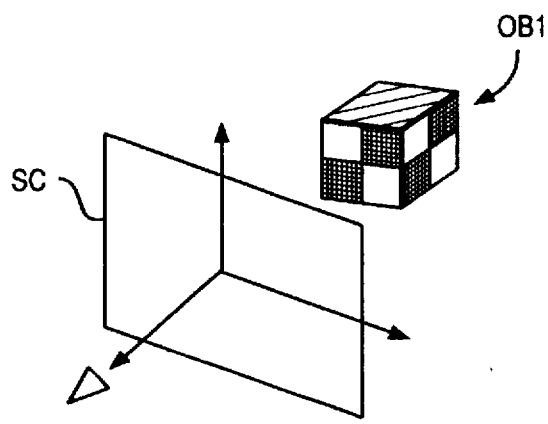
Figure 5D:
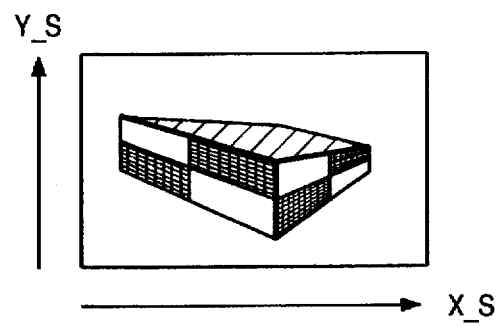

The computer graphics apparatus 10 of the preferred embodiment has an arrangement enabling multiple reference to memory. Then, as described above, the color information (RGBA values) is indexed, and a table of actual color information (color map) is separately prepared in which each index corresponds to each actual color. The index values are then texture-mapped on a polygon (triangle). In this case, it is sufficient to search for color information from the color map on the principle of texture mapping to reflect the color. That is, as shown in FIG. 4 (C), the index values are texture-mapped, the color information is searched for to reflect the color by referencing the color map, and the black-and-white checkered pattern is texture-mapped (see FIG. 4 (D)), or the red-and-green checkered pattern is texture-mapped (see FIG. 4 (E)). While typical texture mapping is performed through all of the command processors, the texture coordinate generator, and the texture memory clusters, the computer graphics apparatus 10 is sufficient to perform texture mapping by using the texture memory clusters only twice if the feedback path 68 is utilized so that such arrangement significantly contributes to improve performance. In addition, it is sufficient to store only one texture image, which also contributes significantly to the effective utilization of resources.

Furthermore, the arrangement containing the feedback path 68 enables only hardware for texture mapping to perform substantially same processing as a general purpose processor so that operation at a higher level becomes possible. For example, it can be effectively used for lighting calculation in the unit of a pixel.

The computer graphics apparatus of the embodiment with the texture memory clusters having the feedback path 68 is very suitable for actual implementation. That is, the texture image data in linear-mipmap-linear can be accessed with one texture memory chip simply by installing a texture memory cluster, or eight memories and their control circuits on a one-chip LSI.

Furthermore, because the filter circuit is included in one chip which is the texture memory cluster, the data interpolation of texel linear and mipmap-linear can be performed so that the pin bottleneck, which has been one of conventional problems in implementation, can be eliminated. Furthermore, because one chip contains all elements for address generation to filtering, an arrangement for multiple referencing of the texture image data can be easily formed by providing the abovementioned feedback path 68.

An important application of recent computer graphics is image processing. This is processing in which two-dimensional data such as a photograph is made discrete, to take them in as an array (image), and to create a different image through appropriate treatment. Its applications include the displaying of CT scans in the medical field, SFX in the cinema, and DTP. Functions commonly used for this processing include image processing such as the deformation of image and filtering. Image processing is provided through X Image Extension (XIE) of the X-Window System or image vision library (IL) of SCI. Texture mapping can be applied to major areas in image processing such as the deformation of images or filtering. Therefore, the present invention can be applied to image processing such as the deformation of images or filtering.

In this case, it is not necessary to display the image itself to be treated or an image being treated on a display.

Therefore, if, in displaying a scene, areas to be treated and mapped and areas not requiring treatment are calculated in parallel, performance can be improved, and hardware resources can be efficiently utilized. In such a case, while parallel calculation is essentially impossible using the conventional computer graphics apparatus because the image is fixedly stored for each span of the display, the calculations can be independently performed for parallel calculation in the embodiment because the image is not fixed to the display (corresponding to the frame buffer).

The present invention is not limited to the embodiment described above. For example, the command bus 16 may be separated into a bus for the texture coordinate generator 14 and a bus for the fragment generators 32–38. If it is separated, it becomes no longer necessary for the data from the command processor 12 to include destinations ("To FG" in Table 4, and "To TG" in Table 5). Instead, so that the texture coordinate generator 14 broadcasts the data to the texture coordinate bus 18, the data may be distributed to each texture memory cluster by appending an address to each texture memory cluster, and specifying the address. In addition, instead, so that each fragment generator is connected to one drawing processor, and the drawing processor disposes of data not handled by it, the data may be disposed of at each fragment generator. Furthermore, although a plurality of fragment generators is provided, the number may be made one which performs broadcasting for each drawing processor. The output from each texture memory cluster may be made addressable instead of being broadcast to the drawing processor assigned with the pixel coordinates to be handled by it.

As described above, according to the present invention, because a plurality of texture memory clusters is connected to a plurality of drawing processors with a bus, and color information is input to the drawing processors from the fragment generators, texture mapping can be efficiently performed by utilizing the texture memory clusters.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claimed is:

1. A computer graphics apparatus for mapping an image onto at least a plane or a curved surface of an object, and displaying the object on a display device, the computer graphics apparatus comprising:

texture coordinator means for generating texture data, the texture coordinator means including means for interpolating the data for the vertexes to data for each point within the polygons;

texture means for storing texture image data of the image, and for generating first color pixel information from the texture image data in response to receiving the generated texture data, the texture means including:

a plurality of memory clusters each including:

a plurality of memory blocks for storing the texture image data;

address means, coupled to each of the memory blocks, for accessing the stored texture image data;

filter means, coupled to each of the memory blocks, for generating the first color pixel information from the accessed texture image data; and feedback means, coupled to the filter means and the address means, for providing the first color pixel information to the address means;

command bus means, coupled to the texture coordinator means and the texture means, for communicating the generated texture data;

fragment generator means for generating second color pixel information;

drawing means for combining the first and second color pixel information, and for displaying the combined pixel color information on the display device;

texture bus means, coupled to the texture means and the drawing means, for communicating the first pixel color information;

a command processor for dividing the object into suitable polygons, and for transmitting the coordinates of texture image data corresponding to the vertices to the texture coordinate generator, and color information corresponding to the vertexes to the fragment generator means.

2. The computer graphics apparatus of claim 1, wherein each one of said memory blocks stores the same texture image data, and said texture coordinate means coordinates the generation of said texture data so that each one of said memory clusters generates said first color pixel information at a fixed time interval.

3. The computer graphics apparatus of claim 2, wherein said texture image data is divided by the total number of said texture memory clusters, and each one of said texture memory clusters stores one of said divided texture image data in their corresponding memory blocks.

4. The computer graphics apparatus of 1, wherein said texture memory clusters ate divided into a plurality of groups, said texture image data being divided into the total number of said groups, each one of said of texture memory clusters belonging to the same one of said groups storing the same divided texture image data.

5. The computer graphics apparatus of claim 1 further comprising:

storage means for storing said texture image data in said memory blocks of each one of said texture memory clusters according to a predetermined storage state.

6. The computer graphics apparatus of claim 5 wherein said predetermined storage state results in said storage means storing the same texture image data in each of one of said memory blocks for a selected one of said memory clusters, and said texture coordinate means coordinates the generation of said texture data so that said selected memory cluster generates first pixel color information at a fixed time interval.

7. The computer graphics apparatus of claim 5 wherein said texture image data is divided by the total number of said memory clusters, and said storage means, in response to detecting said predetermined storage states, stores each of said divided texture image data in each one of said memory clusters'corresponding of memory blocks.

8. The computer graphics apparatus of claim 5 wherein said predetermined storage state divides said memory clusters into a plurality of groups, divides said texture image data by the total number of said groups, and said storage means, in response to detecting said predetermined storage state, stores the same divided texture image data in each one of said memory clusters in the same group.

* * * * *